United States Patent
Lane et al.

(10) Patent No.: US 10,234,533 B2
(45) Date of Patent: Mar. 19, 2019

(54) POSITION DETERMINATION BY OBSERVING A CELESTIAL OBJECT TRANSIT THE SUN OR MOON

(71) Applicant: The Charles Stark Draper Laboratory, Inc., Cambridge, MA (US)

(72) Inventors: Benjamin F. Lane, Sherborn, MA (US); William W. Whitacre, Boston, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 370 days.

(21) Appl. No.: 15/261,316

(22) Filed: Sep. 9, 2016

(65) Prior Publication Data
US 2018/0074154 A1 Mar. 15, 2018

(51) Int. Cl.
| | | |
|---|---|---|
| *G01S 3/78* | (2006.01) | |
| *G01S 3/785* | (2006.01) | |
| *G01C 21/02* | (2006.01) | |
| *G01S 19/48* | (2010.01) | |
| *G01S 3/786* | (2006.01) | |
| *G01S 5/02* | (2010.01) | |

(52) U.S. Cl.
CPC ............. *G01S 3/785* (2013.01); *G01C 21/02* (2013.01); *G01S 3/7867* (2013.01); *G01S 5/0263* (2013.01); *G01S 19/48* (2013.01)

(58) Field of Classification Search
CPC .. G01W 1/00; G01W 2001/003; G06T 7/285; G06T 2207/10021; G06T 2207/30192
See application file for complete search history.

(56) References Cited

U.S. PATENT DOCUMENTS

| | | | |
|---|---|---|---|
| 3,274,880 A | 9/1966 | Lillestrand et al. | 250/214 R |
| 3,936,632 A | 2/1976 | Bradley et al. | 250/237 R |
| 4,159,576 A * | 7/1979 | Campbell | G01C 1/00 33/1 DD |
| 5,177,686 A | 1/1993 | Böinghoff et al. | 364/459 |
| 5,410,143 A | 4/1995 | Jones | 250/206.1 |
| 5,745,869 A | 4/1998 | van Bezooijen | 701/222 |
| 6,133,997 A | 10/2000 | Yamawaki et al. | 356/139.01 |
| 7,105,791 B1 | 9/2006 | Poller | 250/203.1 |
| 7,518,792 B2 | 4/2009 | McWilliams | 359/399 |

(Continued)

FOREIGN PATENT DOCUMENTS

WO    WO 2008/045014 A2    4/2008

OTHER PUBLICATIONS

Pierce, "Modeling Navigation System Performance of a Satellite-Observing Star Tracker Tightly Integrated with an Inertial Measurement Unit," Department of the Air Force Air University, 222 pages, Mar. 2015.

(Continued)

*Primary Examiner* — Luke D Ratcliffe
(74) *Attorney, Agent, or Firm* — Sunstein Kann Murphy & Timbers LLP

(57) ABSTRACT

A navigation system determines a position by referring to artificial or natural satellites or other space objects during daylight or when the objects are in a planet's shadow. A telescope and image sensor observe and image shadows of the objects as the objects transit the sun or a sunlit surface of a planet or moon, thereby solving problems related to the two key times during which traditional SkyMark navigation is difficult or impossible.

12 Claims, 11 Drawing Sheets

(56) References Cited

U.S. PATENT DOCUMENTS

| | | |
|---|---|---|
| 7,786,925 B1 | 8/2010 | Knibbe et al. .................. 342/52 |
| 2009/0177398 A1 | 7/2009 | Belenkii et al. |
| 2011/0085698 A1* | 4/2011 | Tillotson ................. G01W 1/00 |
| | | 382/103 |
| 2012/0249775 A1 | 10/2012 | Paluszek et al. |

OTHER PUBLICATIONS

Wikipedia, Satellite Catalog Number, https://en.wikipedia.org/w/index.php?title=Satellite_Catalog_Number&oldid=677543971, 2 pages, Aug. 24, 2015.

Wikipedia, "Star position," https://en.wikipedia.org/w/index.php?title=Star_position&oldid=653089200, 2 pages, Mar. 23, 2015.

International Searching Authority Authorized Officer Haliva, Yael, Notification of Transmittal of the International Search Report and The Written Opinion of the International Searching Authority, or the Declaration, PCT/US2017/050091, 10 pages, dated Jul. 19, 2018.

* cited by examiner

POSITION DETERMINATION BY OBSERVING A CELESTIAL OBJECT TRANSIT THE SUN OR MOON

STATEMENT REGARDING FEDERALLY SPONSORED RESEARCH OR DEVELOPMENT

This invention was made with Government support under Contract N000030-16-C-0014 awarded by Department of Defense. The Government has certain rights in the invention.

TECHNICAL FIELD

The present invention relates to navigation systems based on celestial sightings and, more particularly, to such systems that image transits of satellites or other sky objects in front of the sun or a sunlit portion of a planet or moon.

BACKGROUND ART

Celestial sightings provide information that can be used to derive platform attitude, direction and position. Celestial navigation techniques have been in use since ancient times, with stars, such as Polaris, originally providing direction information to voyagers. Until the 1950s, elevation angles were measured against a vertical reference provided by the horizon at sea. Subsequently developed mechanizations rely on inertial instruments to maintain knowledge of a local vertical when the horizon is obscured or when measurements are done from a moving platform, such as an aircraft. However, inherent drift of inertial sensors limits accuracy of the vertical measurement and, ultimately, system performance.

It has long been known possible to derive ones position by observing an orbiting satellite against a star-field background. Such a system, known as SkyMark navigation, was developed by The Charles Stark Draper Laboratory, Inc. See, for example, R. Phillips, et. al., Skymark: A Technique for Enhancing Precision Missile Navigation, Missile Sciences Conference, Monterey, Calif., Nov. 16-18, 2004. Angles between the apparent positions of an observed satellite and (assumed known) stars contain information about the location of the observer. However, in some cases, stars or satellites cannot be easily observed. For example, these observations are difficult or impossible in daylight at low elevations, without specially designed optics. In addition, during a period of time around local midnight, satellites in low earth orbit are in a shadow cast by the earth and are, therefore, not illuminated and cannot be observed.

SUMMARY OF EMBODIMENTS

An embodiment of the present invention provides a position determining system. The system includes a telescope. The telescope has a field of view. The telescope is configured to point so as to include at least a portion of a bright celestial object in the field of view. The bright celestial object is one of: the sun or a sunlit planet or a sunlit moon.

The system also includes a pixelated image sensor. The image sensor is optically coupled to an output of the telescope. The system also includes a telescope position estimator. The telescope position estimator is configured to provide an estimated position of the telescope.

The system also includes a telescope pointing direction estimator. The telescope pointing direction estimator is configured to provide an estimated pointing direction of the telescope. A data source provides ephemeral information about a plurality of satellites, and a clock provides a current time.

The system also includes a satellite shadow detector. The satellite shadow detector is coupled to the image sensor. The satellite shadow detector is configured to detect a shadow cast on the image sensor by a satellite transiting the bright celestial object.

A satellite identifier is coupled to the satellite shadow detector. The satellite identifier is configured to identify the satellite based on: the estimated position of the telescope, the estimated pointing direction of the telescope, the current time and the ephemeral information about the plurality of satellites.

An angle estimator is coupled to the satellite shadow detector. The angle estimator is configured to estimate an angle to the satellite. A navigation filter is configured to generate an updated estimated position of the telescope based on: the estimated position of the telescope, an identification of the satellite, the estimated angle to the satellite and the ephemeral information about the plurality of satellites.

The satellite shadow detector may include an edge detector, a temporal median filter, a subtractor, a threshold calculator, a candidate shadow pixel detector, a pixel grouper and a centroid calculator. The edge detector may be configured to detect pixels of the image sensor on which an edge of the bright celestial object is projected by the telescope. The edge detector may thereby detect the edge of the bright celestial object in an image provided by the image sensor.

The temporal median filter may be configured to identify pixels of the image that represent a background, based on the edge of the bright celestial object. The subtractor may be configured to subtract the background from the image. The threshold calculator may be configured to determine an adaptive threshold value for the image. The candidate shadow pixel detector may be configured to select pixels of the image having respective values less than the adaptive threshold value. The candidate shadow pixel detector may thereby detect candidate shadow pixels.

The pixel grouper may be configured to group at least one candidate shadow pixel of the image, thereby detecting at least one candidate satellite shadow. The centroid calculator may be configured to calculate, for each of the at least one candidate satellite shadow, a centroid of the candidate satellite shadow.

The satellite shadow detector may also include a noise filter. The noise filter may be configured to compare the image to a previous frame of the image. The noise filter may be further configured to delete any candidate satellite shadow from the image that is absent from the previous frame of the image.

The navigation filter may be further configured to generate a further updated estimated position of the telescope based on: the updated estimated position of the telescope, another estimated angle to another satellite, based on a subsequent transit of a second bright celestial object by the other satellite and the ephemeral information about the plurality of satellites, wherein the second bright celestial object comprises one of: the bright celestial object or another bright celestial object.

Another embodiment of the present invention provides a position determining system. The system includes a telescope. The telescope has a field of view. The telescope is configured to point so as to include at least a portion of a bright celestial object in the field of view. The bright celestial object is one of: the sun or a sunlit planet or a sunlit moon. The system also includes a pixelated image sensor optically coupled to an output of the telescope.

A data source provides ephemeral information about a plurality of satellites, and a clock provides current time. A navigation filter is coupled to the image sensor, the data source and the clock. The navigation filter is configured to generate an updated estimated position of the telescope based on: an estimated position of the telescope, image data captured by the image sensor as a satellite transits the bright celestial object and the ephemeral information about the plurality of satellites.

The image data may include an estimated angle to a satellite transiting the bright celestial object, as imaged by the image sensor.

Yet another embodiment of the present invention provides a method for determining a position. The method includes using a telescope and an image sensor to generate image data by imaging a bright celestial object as a satellite transits the bright celestial object. The bright celestial object is one of: the sun or a sunlit planet or a sunlit moon. The method includes estimating a position of the telescope and estimating a pointing direction of the telescope.

Using the image data, the estimated position of the telescope and the estimated pointing direction of the telescope, an angle involving the telescope and the satellite is calculated. A current time is read from a clock. Ephemeral data, which is stored in a computer memory, is accessed. The ephemeral data includes ephemeral data about the satellite.

Using a navigation filter, the current time, the angle and the ephemeral data, an updated position of the telescope is estimated, and the estimated position of the telescope is revised, according to the updated position of the telescope.

Calculating the angle may include detecting pixels of the image sensor on which an edge of the bright celestial object is projected by the telescope, thereby detecting the edge of the bright celestial object in the image data. Pixels in the image data that represent a background are identified, based on the edge of the bright celestial object. The background is subtracted from the image data.

An adaptive threshold value is determined for the image data, and pixels of the image data having respective values less than the adaptive threshold value are selected, thereby detecting candidate shadow pixels. At least one candidate shadow pixel of the image data is grouped, thereby detecting at least one candidate satellite shadow. For each of the at least one candidate satellite shadow, a centroid of the candidate satellite shadow is calculated.

Optionally, the method may include comparing the image data to a previous frame of the image data and deleting any candidate satellite shadow from the image data that is absent from the previous frame of the image data.

The telescope and the image sensor may be used to generate further image data by imaging another satellite transiting a second bright celestial object. The second bright celestial object may be one of: the bright celestial object or another bright celestial object. The ephemeral data may include ephemeral data about the other satellite. Using the further image data, a second angle involving the telescope and the other satellite may be calculated.

Using the navigation filter, the second angle and the ephemeral data, a further updated position of the telescope may be estimated and the estimated position of the telescope may be further revised, according to the further updated position of the telescope.

Optionally, the telescope and the image sensor may be used to generate further image data by imaging the satellite transiting a second bright celestial object. The second bright celestial object may be one of: the bright celestial object or another bright celestial object. The other bright celestial object may be one of: the sun or a sunlit planet or a sunlit moon.

The further image data may be used to calculate a second angle involving the telescope and the satellite. Using the navigation filter, the second angle and the ephemeral data, a further updated position of the telescope may be estimated and the position of the telescope may be further revised, according to the further updated position of the telescope.

An embodiment of the present invention provides a non-transitory computer-readable medium. The medium is encoded with instructions. Executing the instructions by a processor establishes processes for performing a computer-implemented method. The computer-implemented method determines a position.

The processes include a process that uses a telescope and an image sensor to generate image data by imaging a bright celestial object as a satellite transits the bright celestial object. The bright celestial object is one of: the sun or a sunlit planet or a sunlit moon.

The processes also include a process that estimates a position of the telescope and a process that estimates a pointing direction of the telescope. The processes also include a process that uses the image data, the estimated position of the telescope and the estimated pointing direction of the telescope to calculate an angle involving the telescope and the satellite.

The processes also include a process that reads a current time from a clock. The processes also include a process that accesses ephemeral data stored in a computer memory. The ephemeral data includes ephemeral data about the satellite. The processes also include a process that uses a navigation filter, the current time, the angle and the ephemeral data to estimate an updated position of the telescope. The processes also include a process that revises the estimated position of the telescope according to the updated position of the telescope.

BRIEF DESCRIPTION OF THE SEVERAL VIEWS OF THE DRAWING

Embodiments of the invention will be more fully understood by referring to the following Detailed Description of Specific Embodiments in conjunction with the Drawings, of which.

DETAILED DESCRIPTION OF SPECIFIC EMBODIMENTS

In accordance with embodiments of the present invention, methods and apparatus are disclosed for determining a position by referring to artificial or natural satellites or other space objects during daylight or when the objects are in a planet's shadow. Embodiments of the present invention observe shadows of the objects as the objects transit the sun or a sunlit surface of a planet or moon, thereby solving problems related to the two key times during which traditional SkyMark navigation is difficult or impossible.

Figure 1:
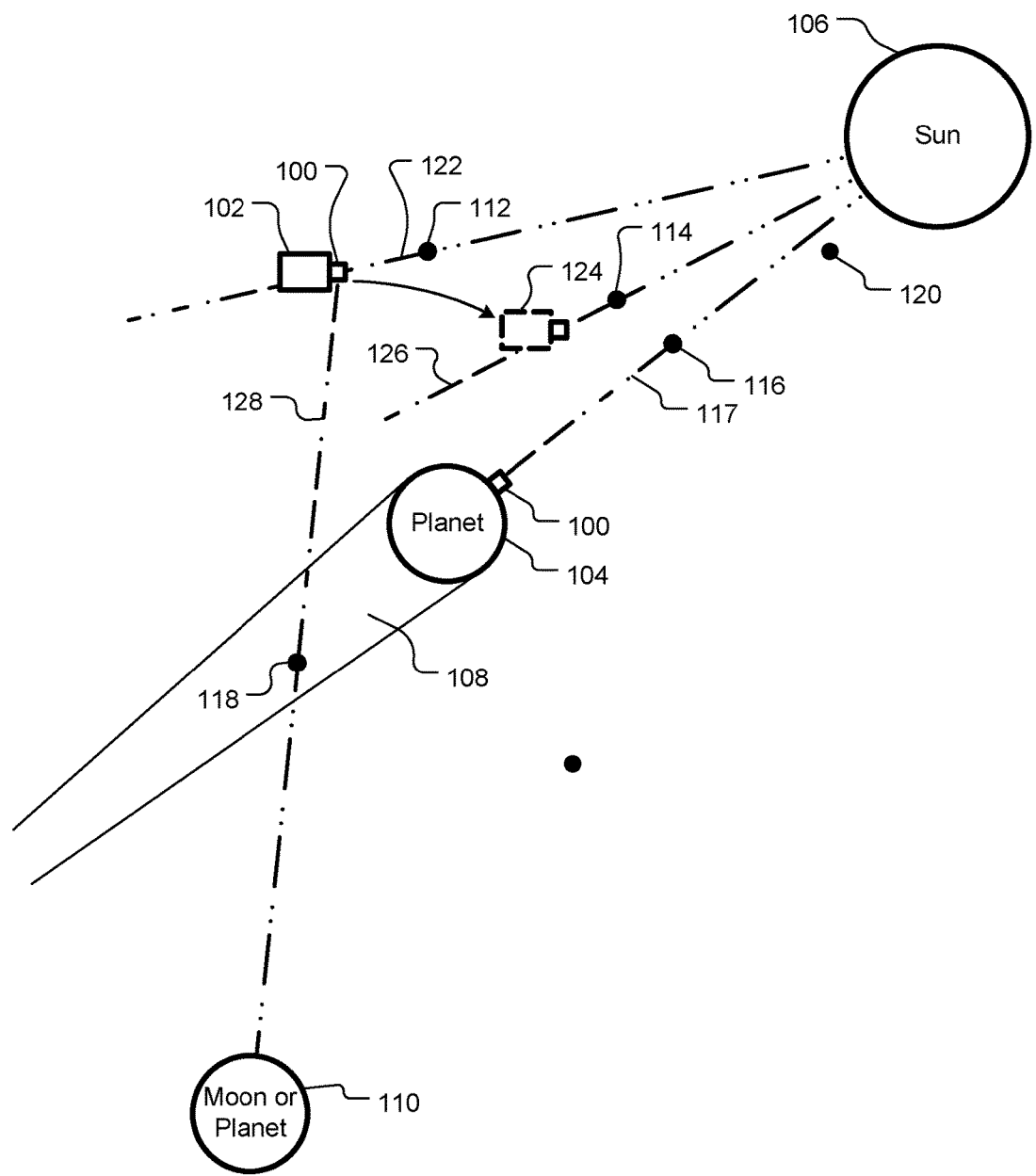
FIG. 1 is schematic illustration of an exemplary hypothetical context in which embodiments of the present invention may be practiced.

FIG. 1 (not to scale) is a schematic illustration of an exemplary hypothetical context in which embodiments of the present invention may be used. A navigation system 100, according to the present disclosure, may be included in a spacecraft or aircraft 102 flying proximate a planet 104, such as Earth or Mars. Alternatively, the navigation system 100 may be located on the surface of the planet 104, such as in a truck or rover or carried by a dismounted person (not shown).

The planet 104 orbits the sun 106 and casts a shadow 108. The navigation system 100 observes transits of satellites in front of the sun 106 or another object, such as a planet or natural satellite (moon) that is illuminated by the sun 106. For example, celestial object 110 may be another planet or a natural satellite (moon) of the planet 104. A portion of the celestial object 110 is illuminated by the sun 106 and may be observed by the navigation system 100 during a transit. As used herein, the term "moon" (without an indication of a planet about which the moon orbits, such as "Earth's moon") means a natural satellite of a planet, not necessarily Earth's moon.

Transiting objects, such as satellites, appear to the navigation system 100 as shadows against the sun 106 or a sunlit object, such as the celestial object 110. For example, the planet 104 may have one or more artificial, i.e., man-made, satellites and/or one or more natural satellites (moons), collectively represented by satellites 112, 114, 116 and 118, orbiting the planet 104. The satellite 118 is within the shadow 108 cast by the planet 104. As used herein, a "satellite" (without the qualifier "natural" or "artificial") is a space object that is apparently smaller than a bright object that the satellite transits when observed for navigational purposes, as described herein.

Optionally or additionally, other natural or man-made objects, such as asteroids, meteors, spacecraft or moons of other planets, represented by object 120, may be present. Such other objects 120 are included in the definition of "satellite," as that term is used herein, as long as ephemeral data is available about the objects 120 and each object 120 is apparently smaller than a bright object that it transits when observed for navigational purposes.

Ephemeral data about the satellites 112-120, whose transits are to be observed, as well as ephemeral data about bright objects that are transited, such as the sun 106, the celestial object 110 and the planet 104, is assumed to be known.

The navigation system 100 may include components of a conventional star tracker. Conventional star trackers operate by imaging stars or bright SkyMark navigation reference points, such as satellites, against a black sky. The navigation system 100 may operate as a conventional star tracker when possible. However, as noted, conventional star trackers do not operate well, or at all, when the SkyMark navigation reference points are in the shadow of a planet. Similarly, SkyMark navigation reference points are difficult or impossible to observe from a planet during daylight hours.

Unlike conventional star trackers, the navigation system 100 may also image shadows of satellites, as the satellites transit bright, relatively large, celestial objects, such as the sun or a sunlit portion of Earth's moon. For example, the navigation system 100 in the spacecraft or aircraft 102 may image the sun 106 while the satellite 112 transits the sun 106. Dashed line 122 indicates a shadow cast by the satellite 112. Similarly, the navigation system 100 on the planet 104 may image a shadow of the satellite 116, as the satellite 116 transits the sun 106. Dashed line 117 indicates a shadow cast by the satellite 116.

As used herein, the term "bright celestial object" means the sun 106 or a sunlit portion of a planet or a sunlit portion of a natural satellite (moon) of a planet, such as the celestial object 110, where the sunlit portion is sufficiently brightly lit to enable detection, by a conventional image sensor, of a difference in brightness between the sunlit portion and a shadow cast by a transiting satellite.

As used herein, the term "relatively large," when used in relation to size of a celestial object, refers to an apparent size, as seen from the navigation system 100, and means an object whose apparent size is at least ten times the apparent size of any star other than the sun 106. Stars in other solar systems generally appear as point sources, although they may be focused onto more than one pixel of an image sensor.

Figure 2:
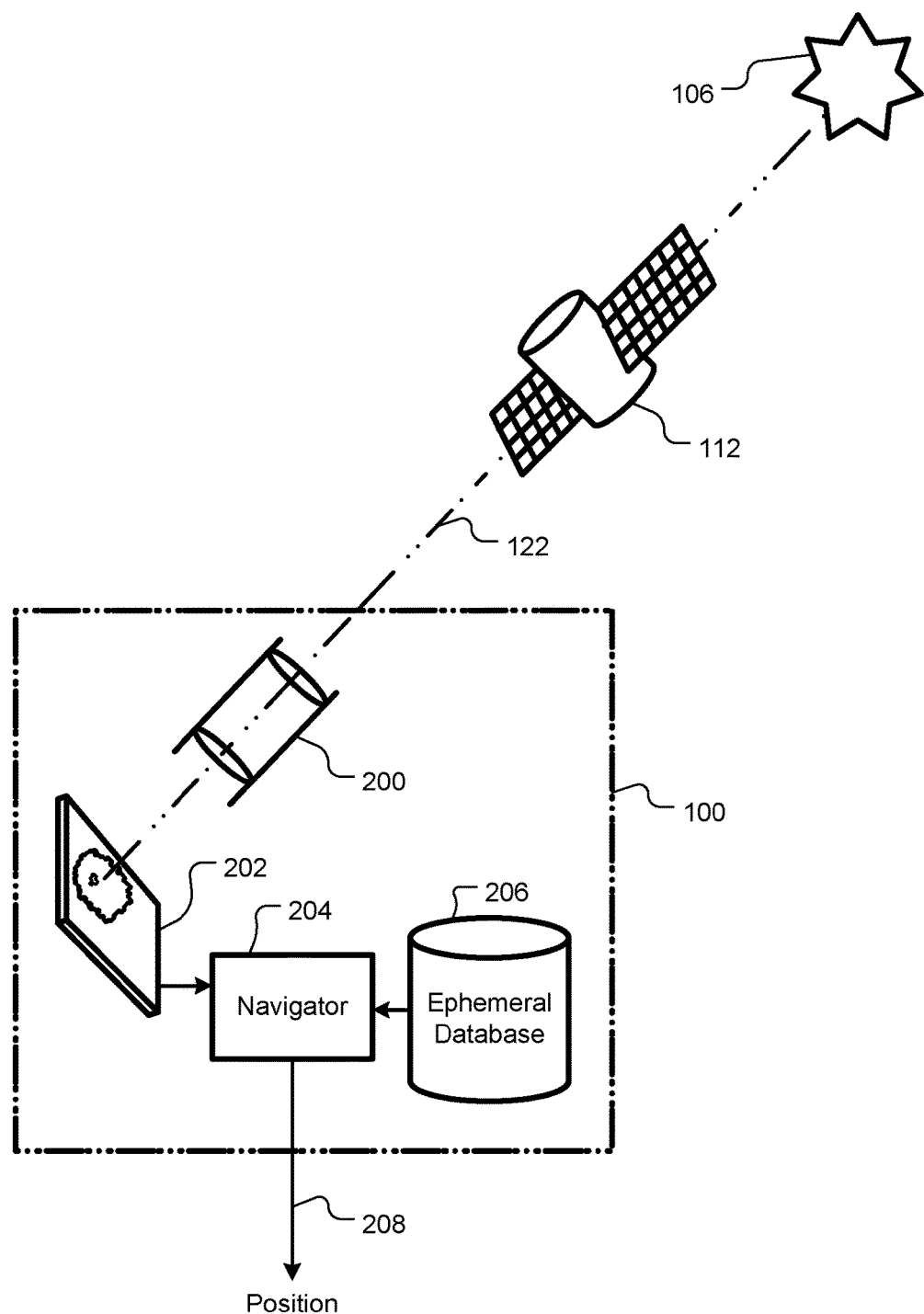
FIG. 2 is a schematic diagram illustrating components of the navigation system, according to embodiments of the present invention.

FIG. 2 is a schematic diagram illustrating components of the navigation system 100, as the navigation system 100 images a transit by the satellite 112 in front of the sun 106. A telescope 200 focuses light from the sun 106 onto a pixelated image sensor 202. The telescope 200 has a field of view, and the telescope 200 is configured to point so as to include at least a portion of the sun 106 in the field of view. The image sensor 202 generates frames of image data. A navigator 204, described in more detail herein, uses an estimated position of the navigation system 100 and information from an ephemeral database 206 to process the image data from the image sensor 202 and calculate a more accurate position, attitude or other navigation information 208 about the navigation system 100. The ephemeral database 206 includes ephemeral information about satellites 112-120 that are planned to be observed transiting the sun 106 and/or other large bright celestial object(s), as well as ephemeral information about the sun 106 and/or the other large bright celestial object(s).

Figure 3:
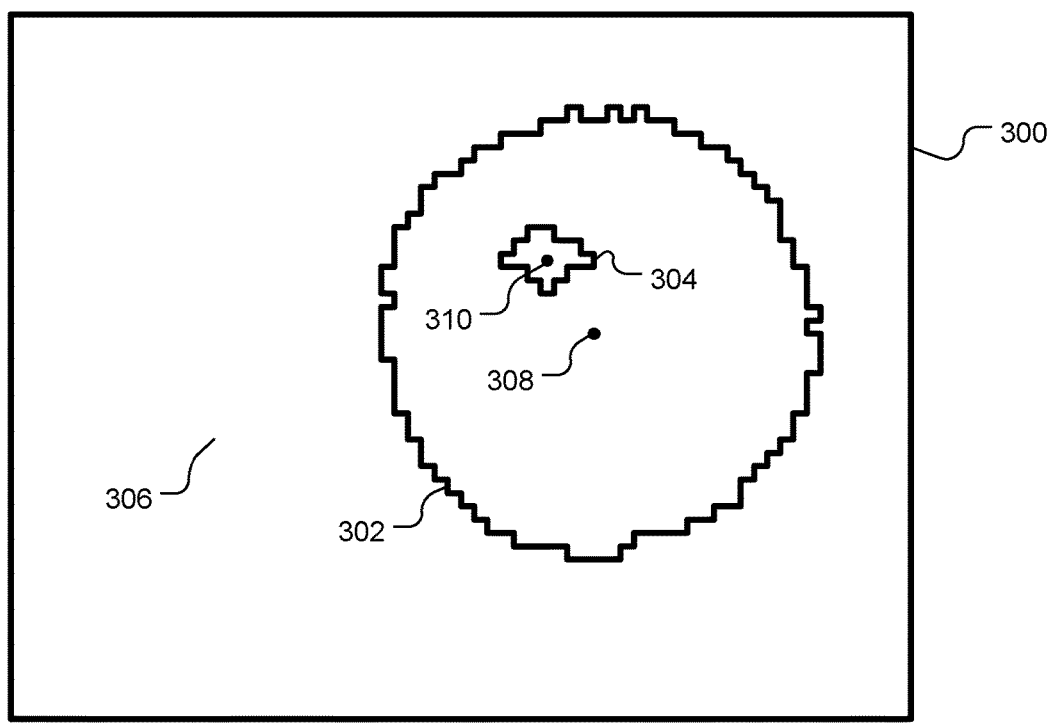
FIG. 3 is a schematic diagram of a hypothetical image formed on an image sensor by a telescope of the navigation system of FIG. 2, according to an embodiment of the present invention.

FIG. 3 is a schematic diagram of a hypothetical image 300, i.e., one frame, formed on the image sensor 202 by the telescope 200 of FIG. 2. Included in the image 300 is an image 302 of the sun 106, as well as a shadow 304 cast by the satellite 112. The entire portion of the image 300 outside the perimeter of the image 302 of the sun 106 is referred to as background 306. The background 306 may include images of stars or other objects, but for purposes of determining position by observing transits, all objects in the background 306 are ignored.

The navigator 204 (FIG. 2) processes the image 300 to calculate a location of a centroid 308 of the image 302 of the sun 106, as well as a location of a centroid 310 of the shadow 304 of the satellite 112. The navigator 204 uses the estimated position of the navigation system 100, the locations of the centroids 308 and 310 (or, equivalently, a distance separating the centroids 308 and 310 and an angle formed by or between the centroids 308 and 310) and the information from the ephemeral database 206 to calculate a more accurate position, attitude or other navigation information 208 about the navigation system 100.

However, from an observation of a single transit, the position 208 of the navigation system 100 can be calculated in only two dimensions, i.e., the position of the navigation system 100 can be determined only to be along the shadow line 122 (FIG. 1), but not where along the shadow line 122. Thus, the navigation system 100 should make at least one additional observation of another satellite or at another time. For example, later, when the spacecraft or aircraft 100 has traveled to another position 124, the navigation system 100 may observe another transit of the sun 106 by another satellite 114 and calculate another position 208 along another line 126.

Optionally or alternatively, at approximately the same time the navigation system 100 observes the transit by the satellite 112 or at another time, the navigation system 100 may image another satellite, such as satellite 118, transiting another large bright celestial object, such as the celestial object 110. A dashed line 128 indicates a shadow cast by the satellite 118, as the satellite 118 is backlit by the illuminated portion of the celestial object 110.

Similarly, the navigation system 100 on the planet 104 may make multiple simultaneous or near simultaneous observations of multiple satellites 112-120, or the navigation system 100 may make multiple observations spaced apart in time to allow the planet 104 to rotate some angular amount between the observations. In either case, together, the two position determinations, along with a measure of an amount of time, if any, that elapsed between the two position determinations, enables the navigation system 100 to determine its position in three-dimensional space.

Figure 4:
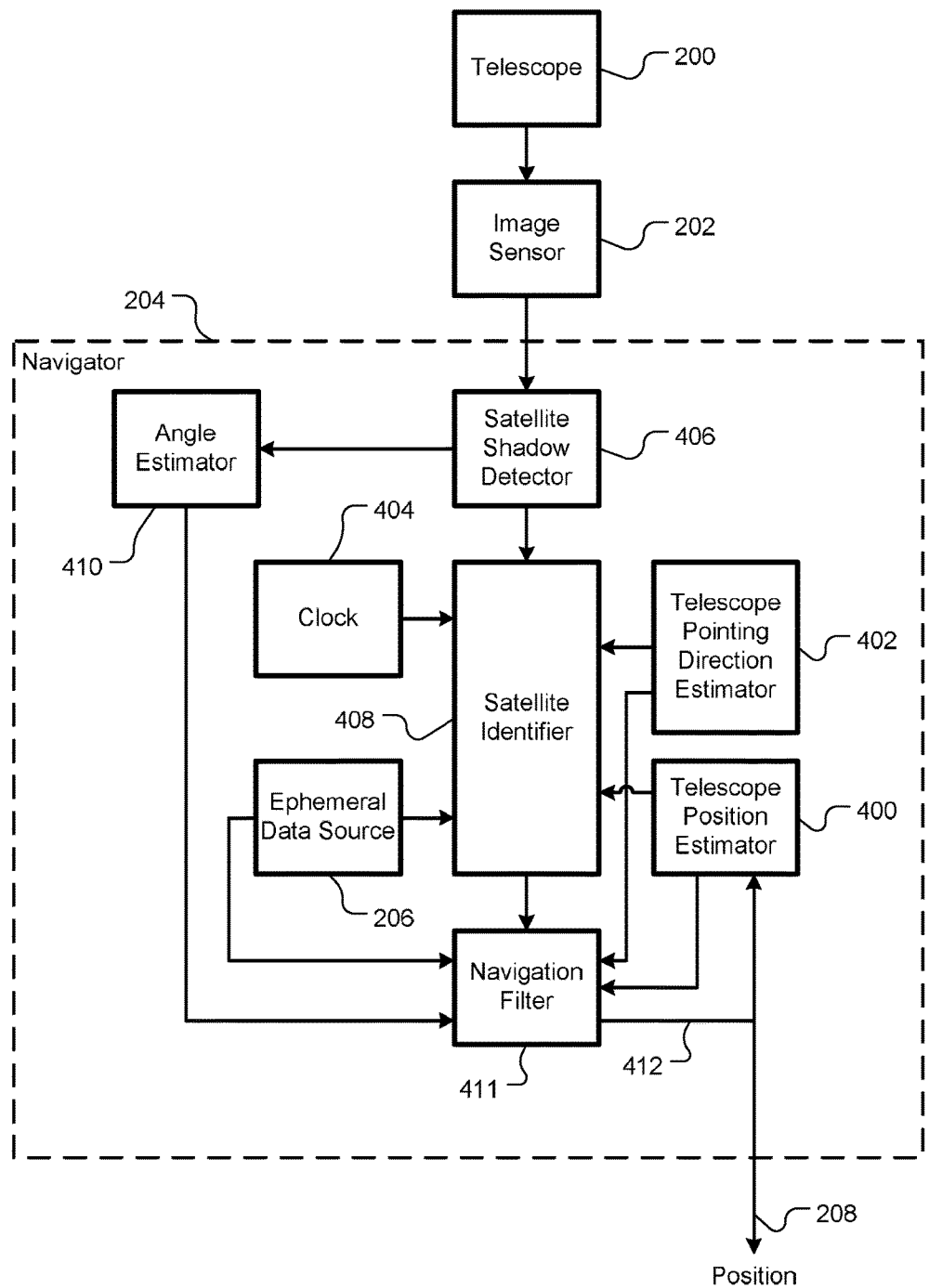
FIG. 4 is a schematic block diagram of the navigation system of FIG. 2, according to an embodiment of the present invention.

FIG. 4 is a schematic block diagram of the navigator 204 of FIG. 2. (For simplicity of illustration, the ephemeral data source 206 is shown within the navigator 204.) A telescope position estimator 400 stores and provides information about an estimated position of the telescope 200. This information may be initialized from another positioning system, such as a global positioning system receiver (GPSr), an inertial guidance system (INS) or conventional star tracking (including using the telescope 200 and image sensor 202 to determine an estimated position), or the information may be initialized by sending information to the navigator 204 from a ground station (not shown) that has tracked the spacecraft or aircraft 100. The estimated position needs to be sufficiently accurate to enable pointing, but not necessarily centering, the telescope 200 at the sun 106 or another large bright celestial object so as to image a transit by the satellite 112.

A telescope pointing direction estimator 402 stores and provides information about an estimate of the pointing direction of the telescope 200. Here again, the estimate needs to be sufficiently accurate to enable pointing, but not necessarily centering, the telescope 200 at the sun 106 or another large bright celestial object so as to image a transit by the satellite 112. Optionally or alternatively, the telescope 200 may be scanned across the sky until the sun 106 is found. The pointing direction may be estimated based on the estimated position of the telescope 200 and an estimated attitude of the spacecraft or aircraft 100, if the telescope 200 field of view is fixed relative to the spacecraft or aircraft 100. Suitable gyroscopes may provide spacecraft or aircraft 100 attitude. If the telescope 200 field of view is adjustable, for example if the telescope 200 is attached to the spacecraft or aircraft 100 via a gimbal mount and can, therefore, be aimed, the pointing direction may be estimated based on the estimated position of the telescope 200, an estimated attitude of the spacecraft or aircraft 100 and the telescope 200 aiming direction, relative to the spacecraft or aircraft 100.

A clock 404 provides current time. In some embodiments, the navigator 204 is activated when a transit of a large bright celestial object by a satellite is expected, according to the estimated position of the telescope 200 (equivalently, an estimated direction to the large bright celestial object), information in the ephemeral data source 206 and the current time from the clock 404.

A satellite shadow detector 406 is coupled to the image sensor 202 and is configured to detect a shadow, such as the shadow 304 (FIG. 3), cast on the image sensor 202 by a satellite, such as the satellite 112, transiting the sun 106 or other large bright celestial object. Additional information about an embodiment of the satellite shadow detector 406 is provided herein.

A satellite identifier 408 is coupled to the satellite shadow detector 406 and is configured to identify the satellite whose shadow is detected. The satellite identifier 408 may identify the satellite based on several inputs, including: an estimated position of the telescope, an estimated pointing direction of the telescope, a current time and the ephemeral information about the satellites. The satellite identity is used to access information about the satellite in the ephemeral data source 206.

An angle estimator 410 is coupled to the satellite shadow detector 406 and is configured to estimate an angle to the identified satellite.

A navigation filter 411 is configured to generate an updated estimated position 412 of the telescope 200 based on: the estimated position of the telescope, the estimated angle to the satellite 112 (the estimated pointing direction of the telescope may be used), an identification of the satellite 112 and the ephemeral information about the satellite 112 and the large bright celestial object, against which the satellite 112 is observed.

Figure 5:
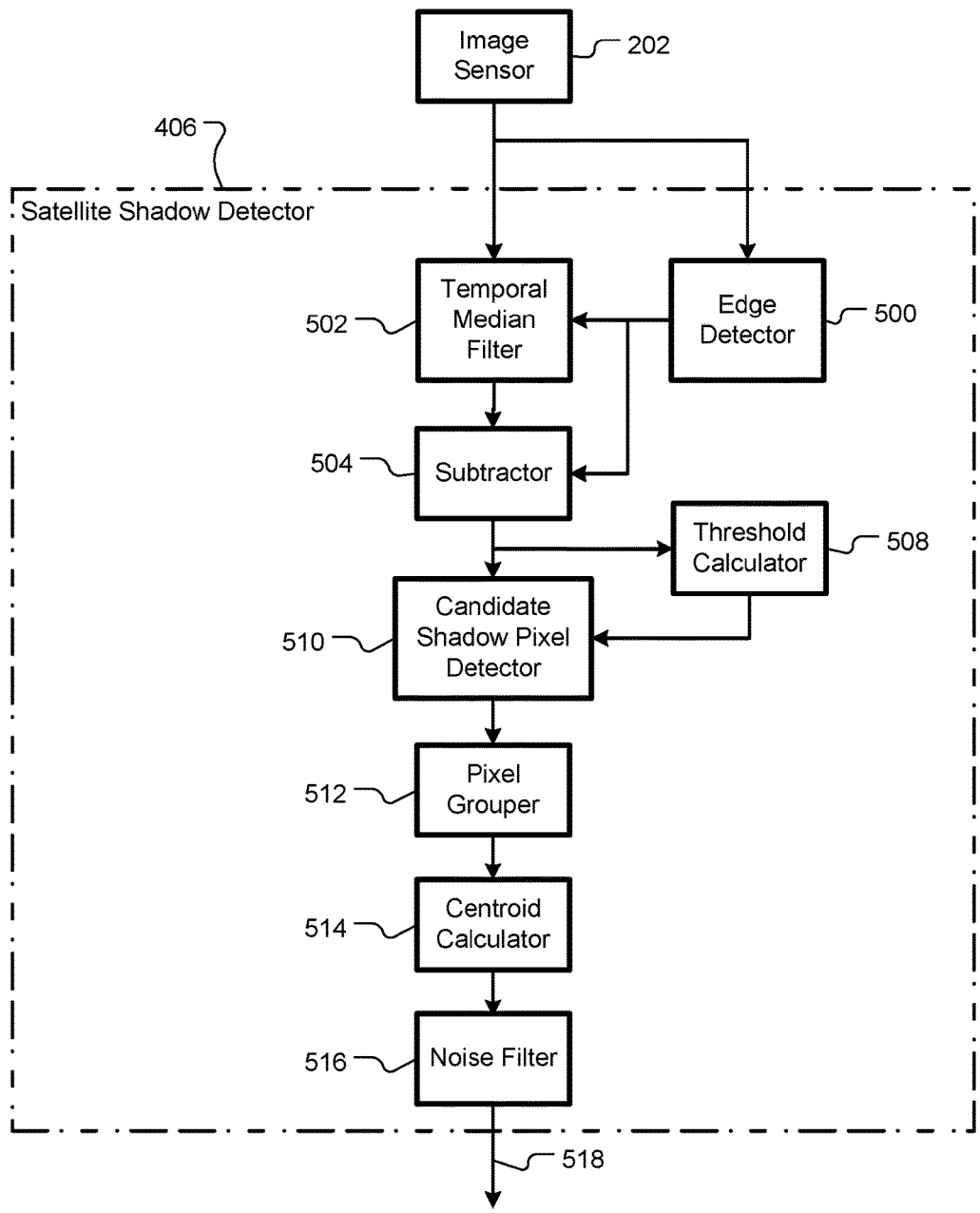
FIG. 5 is a schematic block diagram of a satellite shadow detector of FIG. 4, according to an embodiment of the present invention.

FIG. 5 is a schematic block diagram of the satellite shadow detector 406 of FIG. 4. Image data from the image sensor 202 is provided to an edge detector 500 and to a temporal median filter 502. The edge detector 500 uses thresholding and edge detection to identify pixels of the image that correspond to the edge of the large bright celestial object, exemplified by the image 302 of the sun 106 in FIG. 3, across which the satellite transits.

The background 306 (FIG. 3) is then removed, as follows. The temporal median filter 502 receives information from the edge detector 500 identifying the edge pixels, and the temporal median filter 502 shifts to remain aligned with the image 302 of the sun over time, i.e., from frame to frame of the image. A subtractor 504 subtracts all background 306 pixels from the current image 300 frame, i.e., pixels that are outside the identified edge pixels.

An adaptive threshold calculator 508 computes a threshold value, below which pixel brightness values are assumed to represent shadow. A candidate shadow pixel detector 510 selects pixels whose brightness values fall below the threshold value, and a pixel grouper 512 groups shadow pixels that are contiguous, or proximate each other within a predetermined distance or meet another predefined criterion. Shadows on such pixels are assumed to all be cast by a single satellite. A centroid calculator 514 calculates coordinates of a centroid of each group of shadow pixels.

The output from the candidate shadow pixel detector 510 may contain noise, such as in the form of random pixels that are deemed to represent shadow, but that appear in only one frame, and not in a preceding frame. Optionally, a noise filter 516 compares the centroid coordinates for the current image frame to one or more preceding image frames and drops centroids that do not appear in the same, or neighboring, locations in a predetermined number of the preceding frames.

The telescope position estimator 400 (FIG. 4), telescope pointing direction estimator 402, satellite shadow detector 406, as well as its components 500-516, satellite identifier 408, angle estimator 410 and navigation filter 411 may be implemented as software by a processor executing instructions stored in a memory. The ephemeral data source 206 may be implemented, at least in part, by a memory coupled to the processor by a suitable bus. The clock 404 may be implemented by a real time clock coupled to the processor by a suitable bus. Optionally or alternatively, any of these components, or portions thereof, may be implemented by hardware, such as combinatorial logic, one or more application specific integrated circuits (ASICs) and/or field-programmable gate arrays (FPGAs) or combinations of hardware and software.

Figure 6:
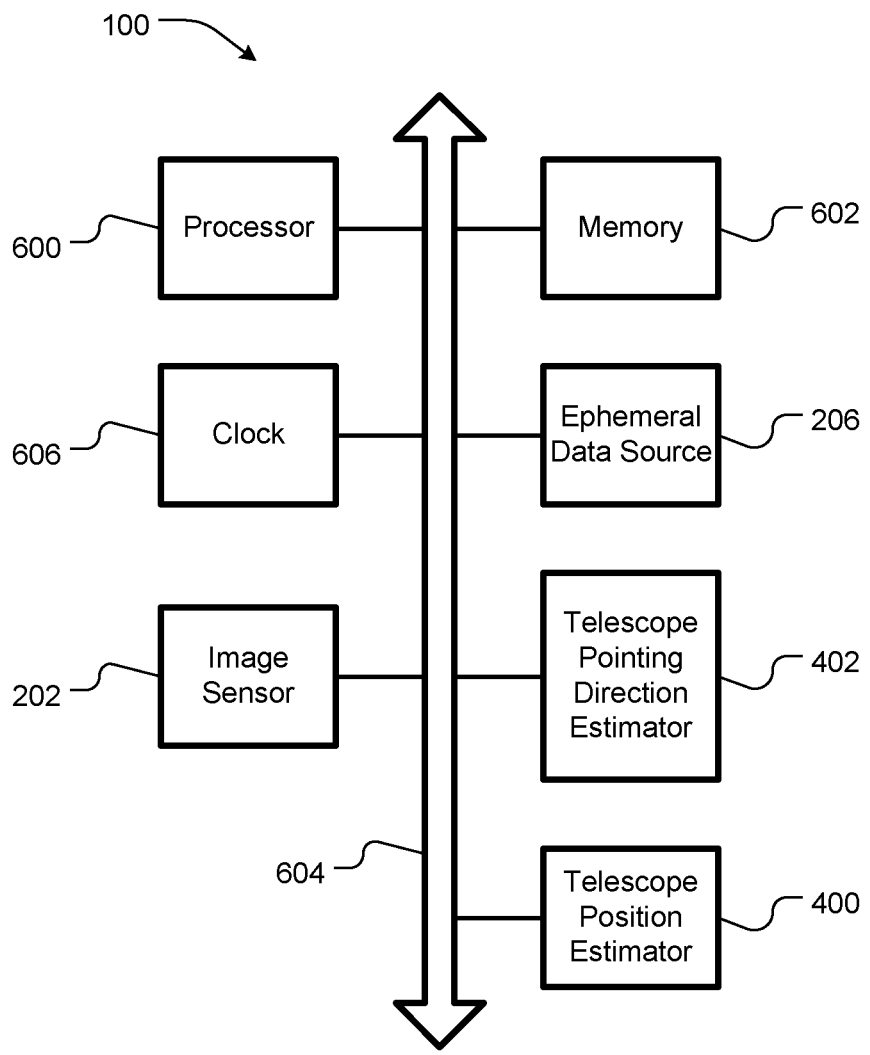
FIG. 6 is a block diagram schematically illustrating a navigation system 100, in which some components are implemented by dedicated hardware components and a processor executing instructions implements other components, according to an embodiment of the present invention.

The telescope position estimator 400 may be, or it may include, an external device, such as a GPSr, at least to initialize the telescope position estimator 400. The telescope pointing direction estimator 402 may be, or it may include, an external device, such as a gyroscope. FIG. 6 is a block diagram schematically illustrating a navigation system 100, in which some components are implemented by dedicated hardware components and a processor executing instructions implements other components, according to an embodiment of the present invention. A processor 600 and a memory 602 are communicatively coupled to a bus 604. A real-time clock 606 and the image sensor 202 are also communicatively coupled to the bus 604. The ephemeral data source 206 may be coupled to the bus 604, or the ephemeral data source 206 may be partially or wholly stored in the memory 602.

Embodiments of the present invention provide methods for determining a position of telescope and, thereby, a position of a space, air or land vehicle on which the telescope is mounted. One such method is schematically illustrated by a flowchart in FIG. 7. At 700, a telescope, such as telescope 200 (FIG. 2), and an image sensor, such as image sensor 202, generates image data by imaging a bright celestial object, such as the sun 106, as a satellite, such as satellite 112, transits the bright celestial object. At 702, a position of the telescope is estimated, such as by the telescope position estimator 400 (FIG. 4). At 704, a pointing direction of the telescope is estimated, such as by the telescope pointing direction estimator 402.

At 706, an angle involving the telescope and the satellite or the bright celestial object is calculated, such as by the angle estimator 410. The calculation uses the image data, the estimated position of the telescope and the estimated pointing direction of the telescope. At 708, the current time is read from a clock, such as the clock 404. At 710, ephemeral data is accessed. The ephemeral data may be stored in a computer memory or another source, such as the ephemeral data source 206. The ephemeral data includes ephemeral data about the bright celestial object and the satellite.

At 712, an updated position of the telescope is estimated using a navigation filter, such as the navigation filter 411, the current time, the angle and the ephemeral data. The position of the telescope may then be revised according to the updated position of the telescope. Optionally, at 716, another satellite, such as satellite 114 or 118, may be observed transiting the same bright celestial object, such as the sun 106, or a different bright celestial object, such as the celestial object 110, and control may return to 700 to calculate a second angle. The second angle involves the telescope and the other satellite or the bright celestial object transited by the other satellite. The second angle is used to further revise the position of the telescope.

Figure 7:
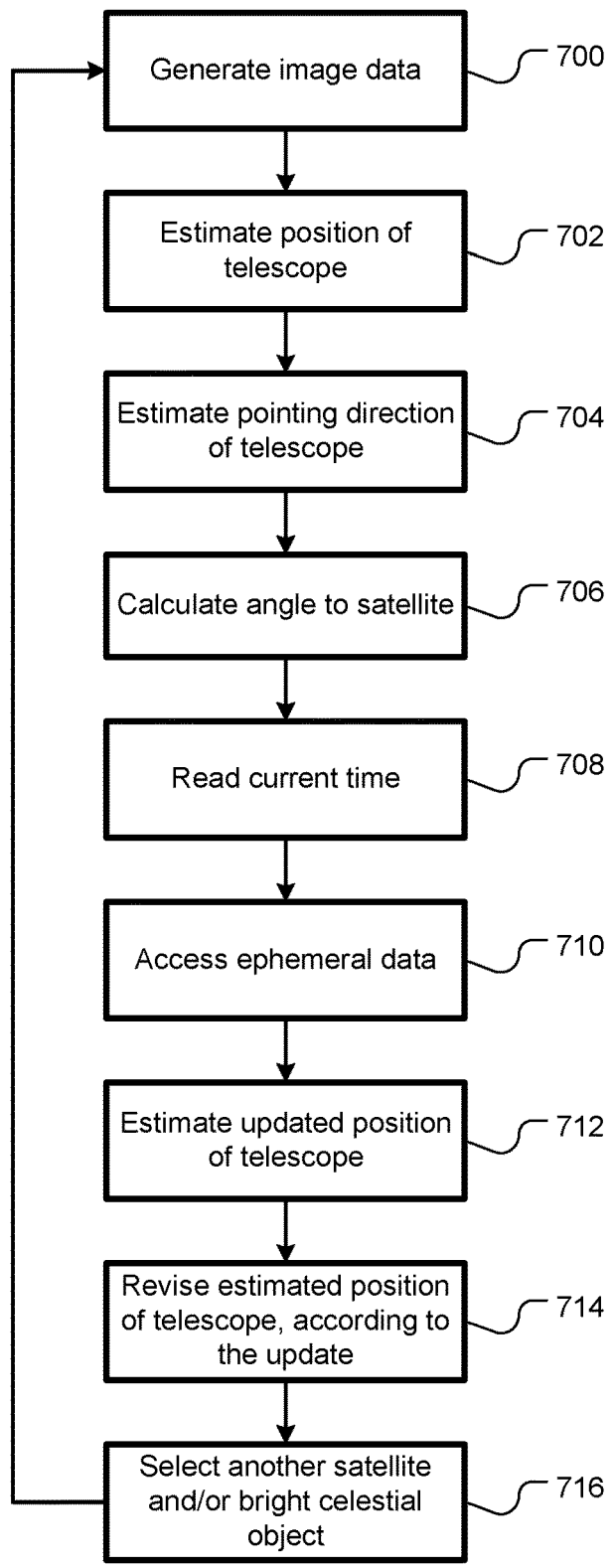
FIG. 7 is a flowchart schematically illustrating steps of a method for determining a position, according to an embodiment of the present invention.
Figure 8:
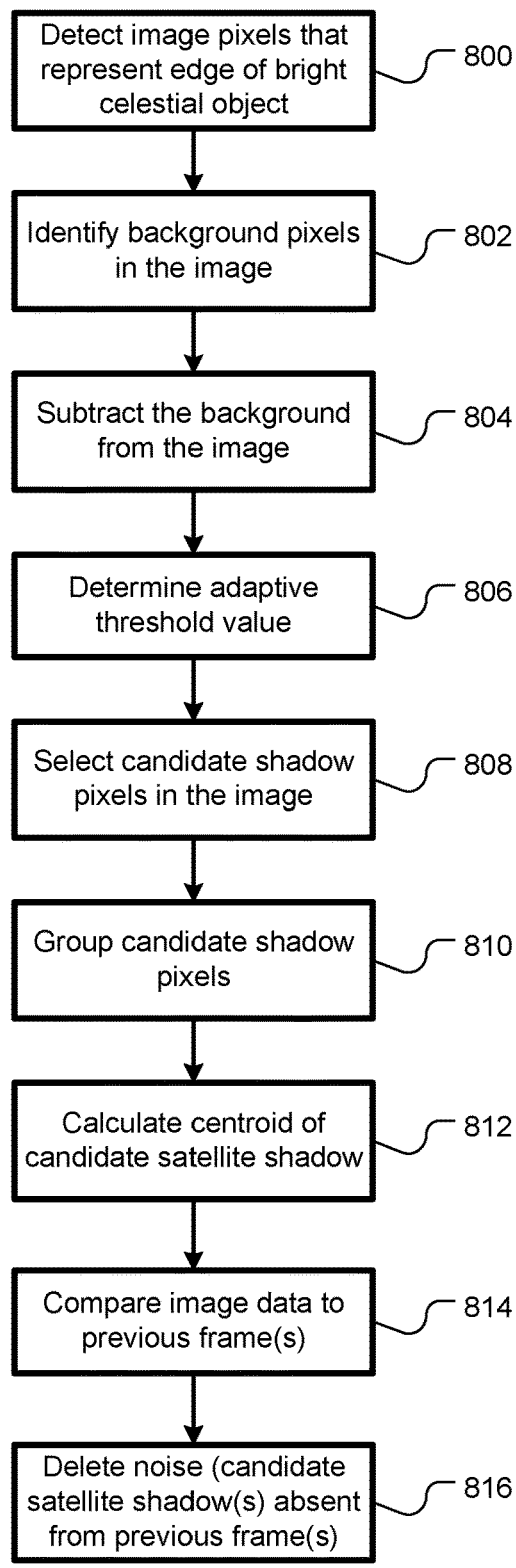
FIG. 8 is a flowchart schematically illustrating operations that may be performed to calculate an angle in the flowchart of FIG. 7, according to an embodiment of the present invention.

FIG. 8 is a flowchart schematically illustrating operations that may be performed to calculate the angle (operation 706 in FIG. 7). At 800, edge pixels are detected. Pixels of the image sensor, on which an edge of the bright celestial object is projected by the telescope, are detected, thereby detecting an edge of the bright celestial object in the image data, such as by the edge detector 500 (FIG. 5). At 802, pixels in the image data representing a background are detected, based on the edge of the bright celestial object, such as by the temporal median filter 502. At 804, the background is subtracted from the image data, such as by the subtractor 504.

At 806, an adaptive threshold value is determined, such as by the threshold calculator 508. At 808, pixels whose values are below the adaptive threshold value are selected as candidate shadow pixels, such as by the candidate shadow pixel detector 510. At 810, candidate shadow pixels that are contiguous, or proximate within a predetermined distance, are grouped, such as by the pixel grouper 512. At 812, a centroid is calculated for each group of candidate shadow pixels, such as by the centroid calculator 514. Optionally, at 814, centroids of the current frame are compared to data in one or more previous frames, and at 816, noise is deleted. That is, candidate satellite shadow(s) absent from the previous frame(s) is/are deleted, such as by the noise filter 516.

Figure 9:
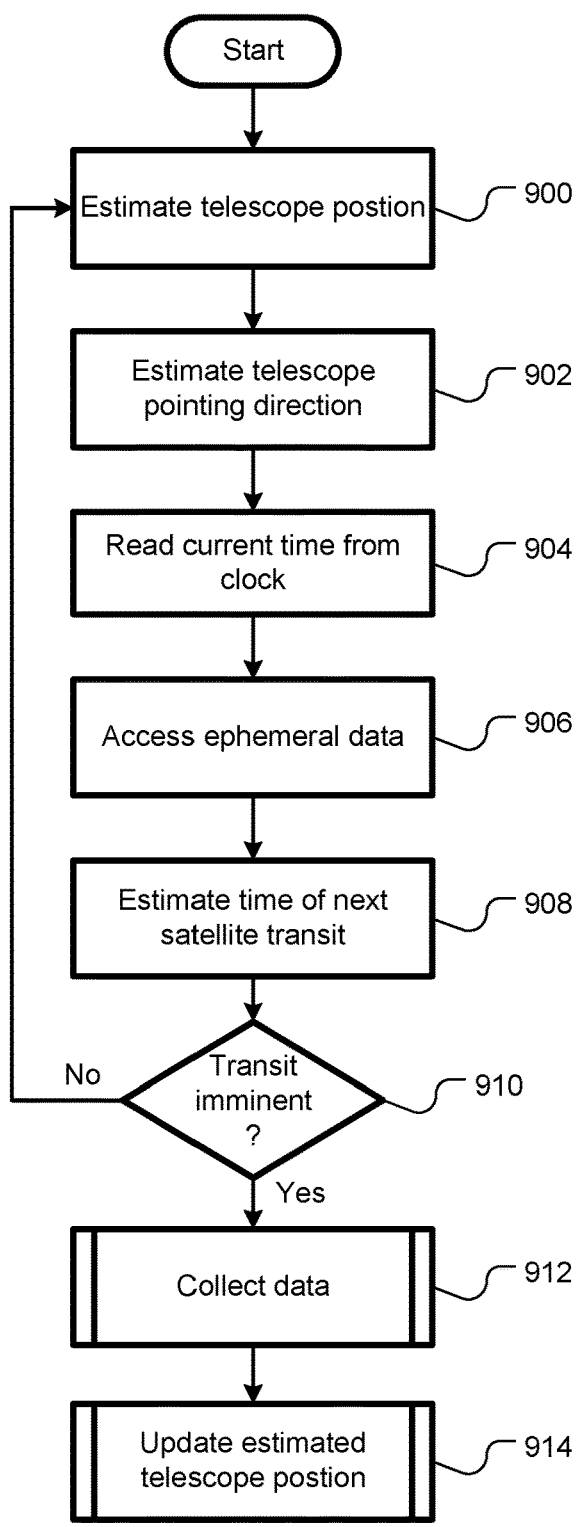
FIG. 9 is a flowchart schematically illustrating operation of a navigation system, such as the navigation system of FIGS. 1-6, according to another embodiment of the present invention.

FIG. 9 is a flowchart schematically illustrating operation of a navigation system, such as the navigation system 100, according to another embodiment. A computer system continuously, periodically or occasionally monitors an estimated direction to a bright celestial object, such as the sun or a sunlit moon, and compares the estimated direction to information in an ephemeral data store that catalogs known satellites. When a calculation determines that a satellite transit that is observable from the navigation system is about to occur, a data collection is enabled. Image data from an image sensor may be processed in real time, as the satellite transits the bright celestial object, or the data may be stored and processed later.

At 900, a telescope position is estimated, and at 902 the telescope's pointing direction is estimated. At 904, the current time is read from a clock, and at 904, ephemeral data is accessed. At 908, a time of a next transit is calculated, based on the estimated telescope position and pointing direction, the current time and the ephemeral data. At 910, if the next transit is imminent, control passes to 912. However, if no transit is imminent, control returns to 900.

At 912, image data is collected, and at 914, the image data is used to update the estimated position of the telescope.

Figure 10:
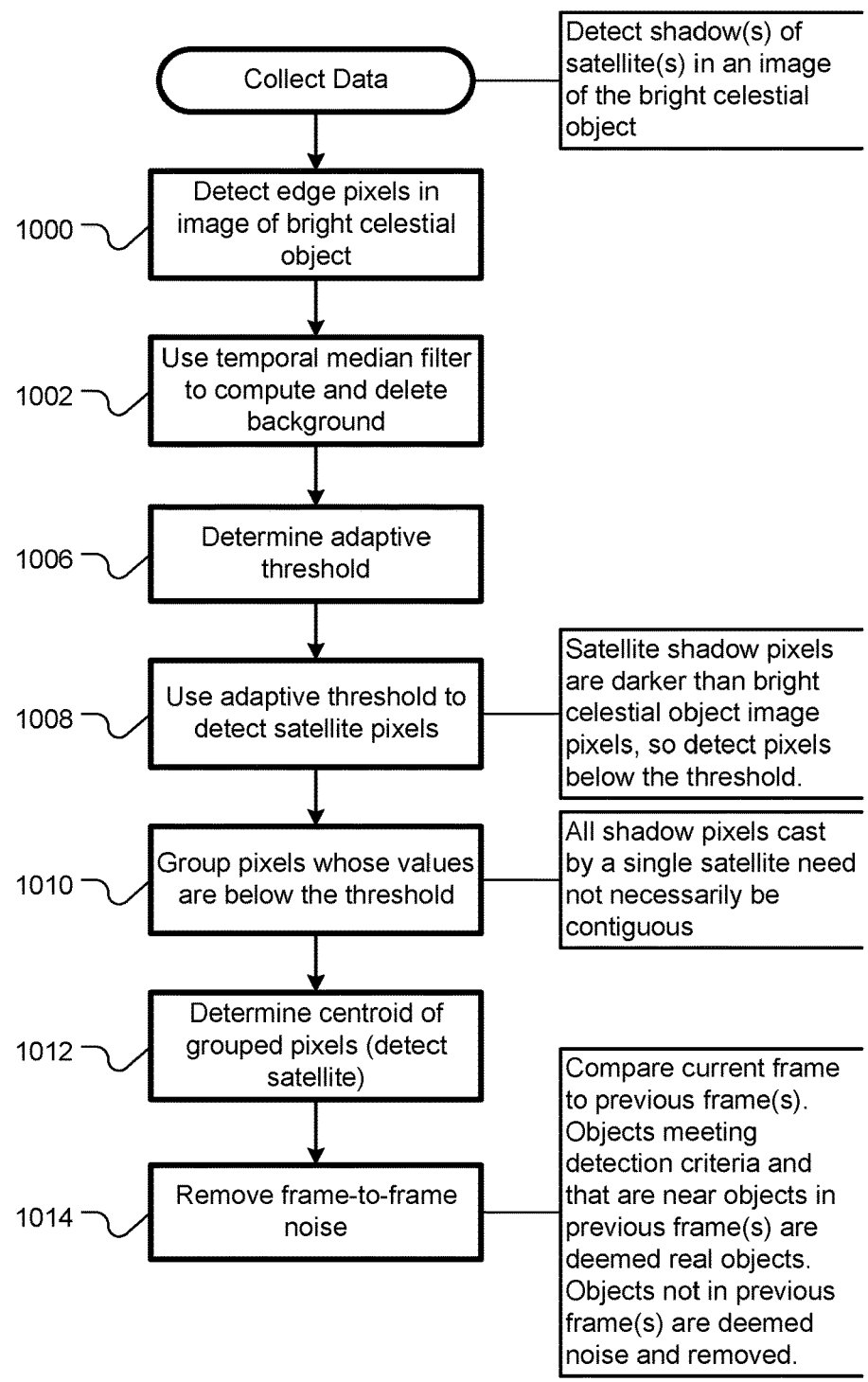
FIGS. 10 and 11 are flowcharts schematically illustrating respective steps of collecting data and updating an estimated position of the flowchart of FIG. 9, according to an embodiment of the present invention.

FIG. 10 is a flowchart schematically illustrating the data collection process 912. At 1000, edge pixels of the bright celestial object are detected. At 1002, a temporal median filter shifts to remain aligned with the bright celestial object. The shifting is based on the edge pixels found at 1000. The temporal median filter identifies and deletes a background, which includes the entire image, outside the edge pixels.

At 1006, an adaptive threshold value for pixel brightness is determined, and at 1008, the threshold is used to detect satellite pixels. Satellite shadow pixels darker than the threshold value are deemed to be satellite shadow pixels. However, all shadow pixels cast by a single satellite may not be contiguous in the image. Therefore, at 1010, pixels that are contiguous, or proximate each other within a predetermined distance or meet another predefined criterion, are deemed to all be cast by a single satellite and are, therefore, grouped together. At 1012, a centroid is determined for each group of satellite shadow pixels, and at 1014, noise (centroids that do not appear in previous frame(s)) are deleted.

Figure 11:
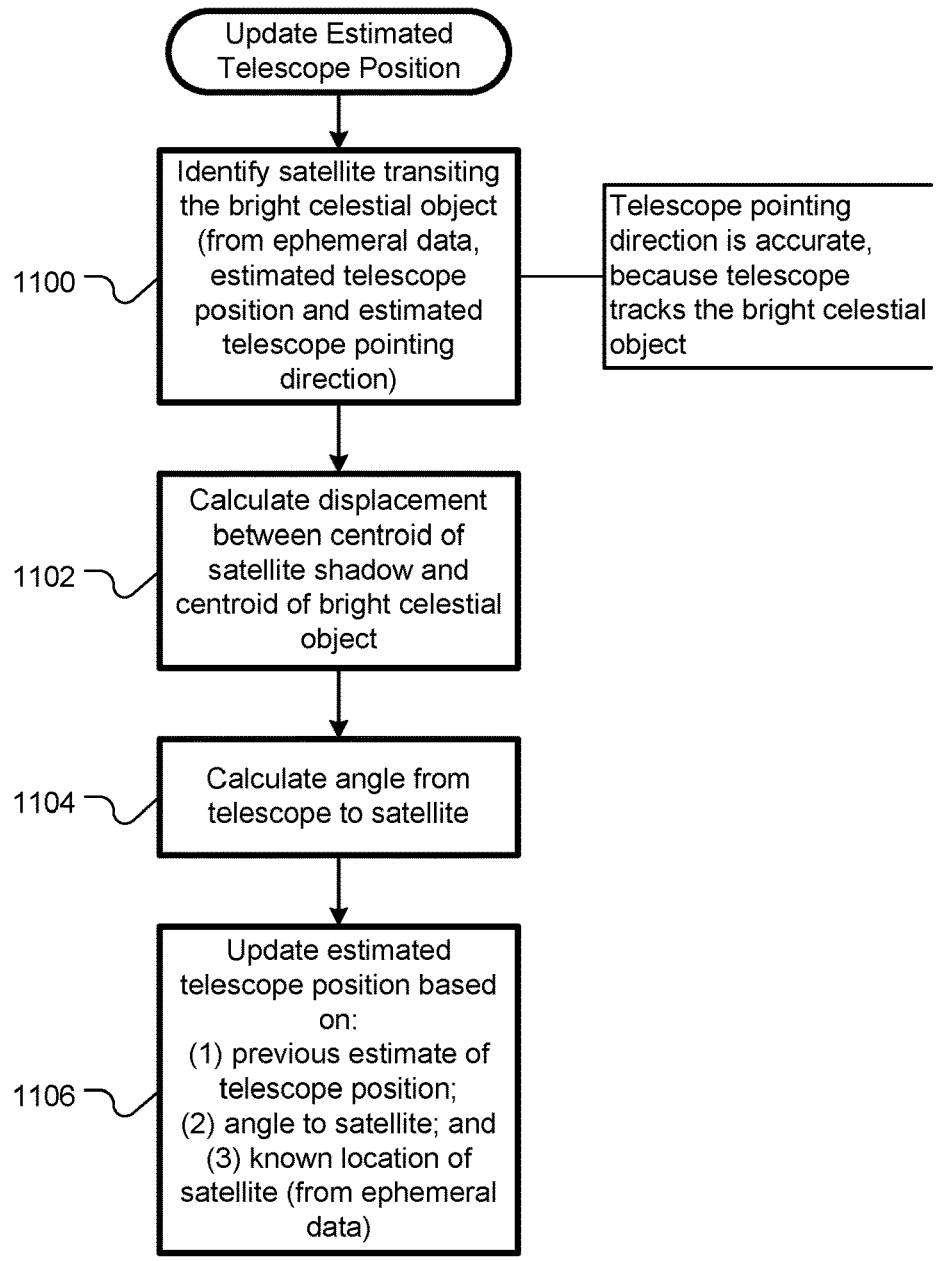

FIG. 11 is a flowchart schematically illustrating operations 914 (FIG. 9), i.e., updating the estimated telescope position. At 1100, the satellite transiting the bright celestial object is identified, using the ephemeral data, estimated telescope position and estimated telescope pointing direction. At 1102, a distance, in the image data, between the centroid 308 (FIG. 3) of the bright celestial object 302 and the centroid 310 of the satellite shadow 304 is calculated. At 1104, this distance is used to calculate an angle from the telescope to the satellite. Once this angle has been calculated, an updated estimate of the telescope position is generated, based on the previous telescope position estimate, the angle to the satellite and the known (from the ephemeral data) location of the satellite.

While the invention is described through the above-described exemplary embodiments, modifications to, and variations of, the illustrated embodiments may be made without departing from the inventive concepts disclosed herein. For example, although specific parameter values, such as dimensions and materials, may be recited in relation to disclosed embodiments, within the scope of the invention, the values of all parameters may vary over wide ranges to suit different applications. Unless otherwise indicated in context, or would be understood by one of ordinary skill in the art, terms such as "about" mean within ±20%.

As used herein, including in the claims, the term "and/or," used in connection with a list of items, means one or more of the items in the list, i.e., at least one of the items in the list, but not necessarily all the items in the list. As used herein, including in the claims, the term "or," used in connection with a list of items, means one or more of the items in the list, i.e., at least one of the items in the list, but not necessarily all the items in the list. "Or" does not mean "exclusive or."

Although aspects of embodiments may be described with reference to flowcharts and/or block diagrams, functions, operations, decisions, etc. of all or a portion of each block, or a combination of blocks, may be combined, separated into separate operations or performed in other orders. References to a "module" are for convenience and not intended to limit its implementation. All or a portion of each block, module or combination thereof may be implemented as computer program instructions (such as software), hardware (such as combinatorial logic, Application Specific Integrated Circuits (ASICs), Field-Programmable Gate Arrays (FPGAs), processor or other hardware), firmware or combinations thereof.

Embodiments, or portions thereof, may be implemented by one or more processors executing, or controlled by, instructions stored in a memory. Each processor may be a general purpose processor, such as a central processing unit (CPU), a graphic processing unit (GPU), digital signal processor (DSP), a special purpose processor, etc., as appropriate, or combination thereof.

The memory may be random access memory (RAM), read-only memory (ROM), flash memory or any other memory, or combination thereof, suitable for storing control software or other instructions and data. Instructions defining the functions of the present invention may be delivered to a processor in many forms, including, but not limited to, information permanently stored on tangible non-writable storage media (e.g., read-only memory devices within a computer, such as ROM, or devices readable by a computer I/O attachment, such as CD-ROM or DVD disks), information alterably stored on tangible writable storage media (e.g., floppy disks, removable flash memory and hard drives) or information conveyed to a computer through a communication medium, including wired or wireless computer networks. Moreover, while embodiments may be described in connection with various illustrative data structures, systems may be embodied using a variety of data structures.

Disclosed aspects, or portions thereof, may be combined in ways not listed above and/or not explicitly claimed. In addition, embodiments disclosed herein may be suitably practiced, absent any element that is not specifically disclosed herein. Accordingly, the invention should not be viewed as being limited to the disclosed embodiments.

What is claimed is:

1. A position determining system, comprising:
a telescope having a field of view and configured to point so as to include at least a portion of a bright celestial object in the field of view, wherein the bright celestial object comprises one of: the sun or a sunlit planet or a sunlit moon;
a pixelated image sensor optically coupled to an output of the telescope;
a telescope position estimator configured to provide an estimated position of the telescope;
a telescope pointing direction estimator configured to provide an estimated pointing direction of the telescope;
a data source providing ephemeral information about a plurality of satellites;
a clock providing a current time;
a satellite shadow detector coupled to the pixelated image sensor and configured to detect a shadow cast on the pixelated image sensor by a satellite transiting the bright celestial object;
a satellite identifier coupled to the satellite shadow detector and configured to identify the satellite based on: the estimated position of the telescope, the estimated pointing direction of the telescope, the current time and the ephemeral information about the plurality of satellites;
an angle estimator coupled to the satellite shadow detector and configured to estimate an estimated angle to the satellite; and
a navigation filter configured to generate an updated estimated position of the telescope based on: the estimated position of the telescope, an identification of the satellite, the estimated angle to the satellite and the ephemeral information about the plurality of satellites.

2. A position determining system according to claim 1, wherein the satellite shadow detector comprises:
an edge detector configured to detect pixels of the pixelated image sensor on which an edge of the bright celestial object is projected by the telescope, thereby detecting the edge of the bright celestial object in an image provided by the pixelated image sensor;
a temporal median filter configured to identify pixels of the image that represent a background, based on the edge of the bright celestial object;
a subtractor configured to subtract the background from the image;
a threshold calculator configured to determine an adaptive threshold value for the image;
a candidate shadow pixel detector configured to select pixels of the image having respective values less than the adaptive threshold value, thereby detecting candidate shadow pixels;
a pixel grouper configured to group at least one candidate shadow pixel of the image, thereby detecting at least one candidate satellite shadow; and
a centroid calculator configured to calculate, for each candidate satellite shadow of the at least one candidate satellite shadow, a centroid of the candidate satellite shadow.

3. A position determining system according to claim 2, wherein the satellite shadow detector further comprises:
a noise filter configured to compare the image to a previous frame of the image and to delete any candidate satellite shadow from the image that is absent from the previous frame of the image.

4. A position determining system according to claim 1, wherein the navigation filter is further configured to generate a further updated estimated position of the telescope based on: the updated estimated position of the telescope, another estimated angle to another satellite, based on a subsequent transit of a second bright celestial object by the another satellite and the ephemeral information about the plurality of satellites, wherein the second bright celestial object comprises one of: the bright celestial object or another bright celestial object.

5. A position determining system, comprising:
a telescope having a field of view and configured to point so as to include at least a portion of a bright celestial object in the field of view, wherein the bright celestial object comprises one of: the sun or a sunlit planet or a sunlit moon;
a pixelated image sensor optically coupled to an output of the telescope;
a data source providing ephemeral information about a plurality of satellites;
a clock providing current time; and
a navigation filter coupled to the image sensor, the data source and the clock and configured to generate an updated estimated position of the telescope based on: an estimated position of the telescope, image data captured by the image sensor as a satellite transits the bright celestial object and the ephemeral information about the plurality of satellites.

6. A position determining system according to claim 5, wherein the image data comprises an estimated angle to a satellite transiting the bright celestial object, as imaged by the pixelated image sensor.

7. A method for determining a position, the method comprising:
using a telescope and an image sensor to generate image data by imaging a bright celestial object as a satellite transits the bright celestial object, wherein the bright celestial object comprises one of: the sun or a sunlit planet or a sunlit moon;
estimating a position of the telescope;
estimating a pointing direction of the telescope;
using the image data, the estimated position of the telescope and the estimated pointing direction of the telescope, calculating an angle involving the telescope and the satellite;
reading a current time from a clock;
accessing ephemeral data stored in a computer memory, the ephemeral data including ephemeral data about the satellite;
using a navigation filter, the current time, the angle and the ephemeral data, estimating an updated position of the telescope; and
revising the estimated position of the telescope according to the updated position of the telescope.

8. A method according to claim 7, wherein calculating the angle comprises:
detecting pixels of the image sensor on which an edge of the bright celestial object is projected by the telescope, thereby detecting the edge of the bright celestial object in the image data;
identifying pixels in the image data that represent a background, based on the edge of the bright celestial object;
subtracting the background from the image data;
determining an adaptive threshold value for the image data;
selecting pixels of the image data having respective values less than the adaptive threshold value, thereby detecting candidate shadow pixels;
grouping at least one candidate shadow pixel of the image data, thereby detecting at least one candidate satellite shadow; and
calculating, for each of the at least one candidate satellite shadow, a centroid of the candidate satellite shadow.

9. A method according to claim 8, further comprising:
comparing the image data to a previous frame of the image data; and
deleting any candidate satellite shadow from the image data that is absent from the previous frame of the image data.

10. A method according to claim 7, further comprising:
using the telescope and the image sensor to generate further image data by imaging another satellite transiting a second bright celestial object, wherein the second bright celestial object comprises one of: the bright celestial object or another bright celestial object, and the ephemeral data includes ephemeral data about the other satellite;
using the further image data, calculating a second angle involving the telescope and the other satellite;
using the navigation filter, the second angle and the ephemeral data, estimating a further updated position of the telescope; and
further revising the estimated position of the telescope according to the further updated position of the telescope.

11. A method according to claim 7, further comprising:
using the telescope and the image sensor to generate further image data by imaging the satellite transiting a second bright celestial object, wherein the second bright celestial object comprises one of: the bright celestial object or another bright celestial object, wherein the another bright celestial object comprises one of: the sun or a sunlit planet or a sunlit moon;
using the further image data, calculating a second angle involving the telescope and the satellite;

using the navigation filter, the second angle and the ephemeral data, estimating a further updated position of the telescope; and further revising the position of the telescope according to the further updated position of the telescope.

12. A non-transitory computer-readable medium encoded with instructions that, when executed by a processor, establish processes for performing a computer-implemented method of determining a position, the processes comprising:

a process that uses a telescope and an image sensor to generate image data by imaging a bright celestial object as a satellite transits the bright celestial object, wherein the bright celestial object comprises one of: the sun or a sunlit planet or a sunlit moon;

a process that estimates a position of the telescope;

a process that estimates a pointing direction of the telescope;

a process that uses the image data, the estimated position of the telescope and the estimated pointing direction of the telescope to calculate an angle involving the telescope and the satellite;

a process that reads a current time from a clock;

a process that accesses ephemeral data stored in a computer memory, the ephemeral data including ephemeral data about the satellite;

a process that uses a navigation filter, the current time, the angle and the ephemeral data to estimate an updated position of the telescope; and a process that revises the estimated position of the telescope according to the updated position of the telescope.

* * * * *